Nov. 5, 1929.        A. M. BULEY ET AL        1,734,200
          PROCESS OF MAKING ALUMINUM CHLORIDE
                    Filed Aug. 31, 1926
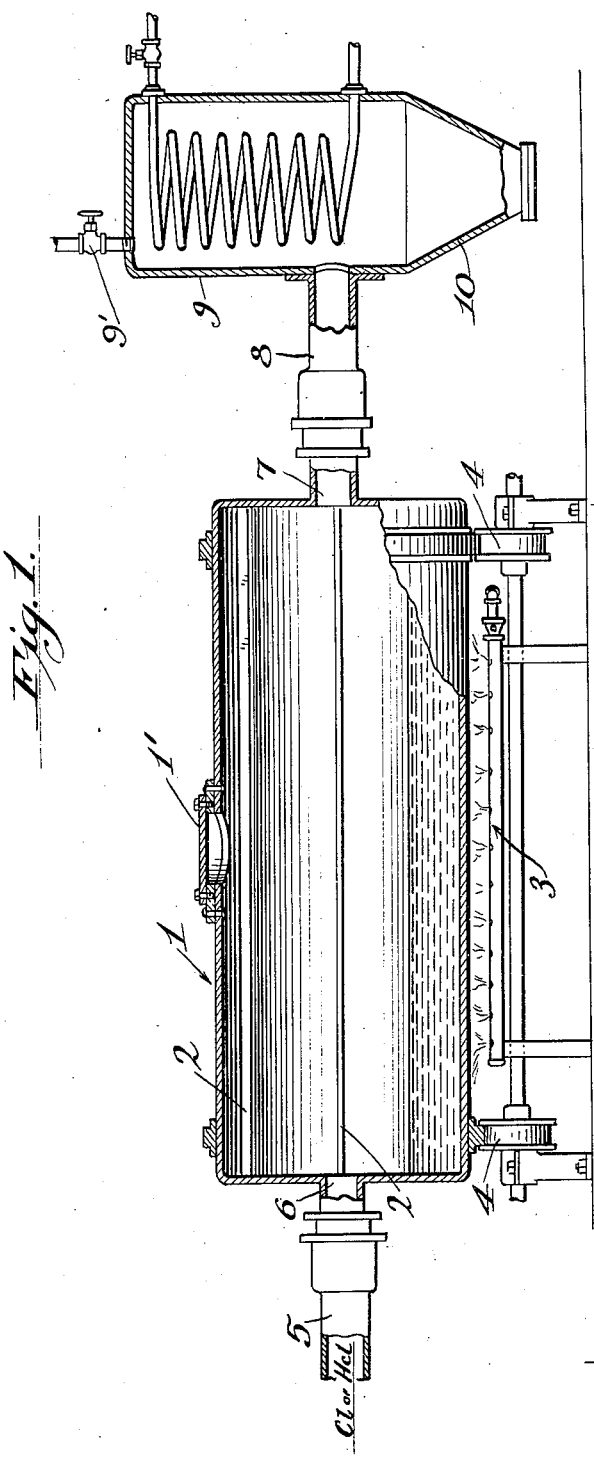
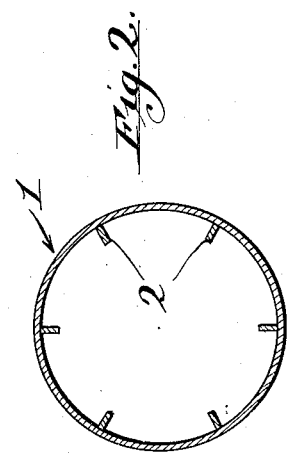

Patented Nov. 5, 1929

1,734,200

UNITED STATES PATENT OFFICE

AMOS M. BULEY, OF LOS ANGELES, CALIFORNIA, AND HENRY BLUMENBERG, JR., OF MOAPA, NEVADA

PROCESS OF MAKING ALUMINUM CHLORIDE

Application filed August 31, 1926. Serial No. 132,889.

Our invention relates to a process of making aluminum chloride.

It is an object of this invention to provide an improved process of making anhydrous aluminum chloride which overcomes the defect present in the old process whereby molten aluminum is subjected to a chloridizing condition by passing chlorine gas over the molten metal.

In the old process the reaction is retarded by the formation of aluminum oxide preventing the intimate contact necessary for a clean cut reaction between the chlorine and the aluminum metal bath.

It is an object of this invention to provide means whereby such oxidization as well as the formation of aqueous vapor is prevented and the aluminum metal in the presence of a chloridizing agent is quickly converted into an anhydrous aluminum chloride, practically free of water of crystallization.

It is another object of this invention to subject molten aluminum in a rotating drum in the presence of a reducing agent such as carbon and the like to a chloridizing agent and to recover the sublimated anhydrous aluminum chloride in a continuous process.

Our invention consists in the steps of the process hereinafter described and claimed.

In the accompanying drawing we have shown an apparatus in diagram suitable for carrying out our process.

Figure 1 is a sectional view of an apparatus suitable for carrying out our process.

Fig. 2 is a cross section of the rotating cylinder.

Referring to the drawing, 1 represents a cylindrical shell provided with radial agitating blades 2 in which the metal aluminum is melted and kept in a molten condition by means of suitable heating apparatus such as a furnace 3, 4—4 indicate means for revolving the cylindrical shell 1. Chlorine gas is introduced through pipe 5 entering the shell 1 at 6 and the aluminum chloride formed in the shell 1 is conducted through apertures 7 of the shell to a conduit 8 to a condenser 9 of any suitable or preferred construction, said condenser being preferably hopper shaped 10 at the bottom.

Aluminum is introduced by means of man-hole 1' of shell 1 and heated until it is melted requiring about 700° C. A quantity of powdered charcoal or other carbonaceous matter or other reducing agent such as carbon monoxide, is introduced with the aluminum which serves to combine with any oxygen that may be present either in the melt or otherwise introduced into the shell 1 and prevents the formation of aluminum oxide, being itself gradually converted into either carbon dioxide or carbon monoxide or both.

The chlorine gas entering the shell 1 comes in intimate contact with the molten metal which, it will be understood, is constantly agitated by reason of the revolution of the shell 1 provided with the agitation blades 2. The reaction takes place as follows:

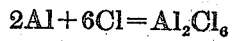

The aluminum chloride formed is sublimated and condensed in the condenser 9 while the uncondensed gases such as carbon monoxide and carbon dioxide are permitted to escape through a valved outlet pipe 9' from the condenser. The condensed anhydrous aluminum chloride will settle in the shape of fine yellow crystals to the hopper bottom 10 of the condenser and may thence be packed into air tight metal drums or any other suitable condensers.

In place of the chlorine, hydrochloric acid may be used, which, it will be understood, will form as a by-product hydrogen which subsequently escapes through valved outlet pipe 9' from the condenser.

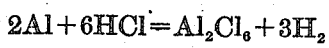

Our process is particularly adapted to metallic aluminum scraps such as old castings and the like which are more or less in oxidized condition for the revolving of shell 1 will thoroughly mix and agitate the molten metal with the carbonaceous material thereby accelerating the reaction between the chlorine and the aluminum, and preventing the formation of any aqueous vapor, when hydrochloric acid is used.

The reaction takes place under ordinary pressure.

The resulting aluminum chloride is practically free from water of crystallization. In our experiments not more than 1-2 per cent of water was contained in the aluminum chloride produced.

Various changes in the steps of the process may be made without departing from the spirit of our invention, as claimed.

We claim:

A process of making aluminum chloride comprising subjecting molten aluminum to the action of chlorine in the presence of a carbon capable of acting as a reducing agent under agitation and condensing the aluminum chloride vapors formed.

In testimony whereof we have signed our names to this specification.

A. M. BULEY.
HENRY BLUMENBERG, Jr.